Feb. 24, 1931. V. VALLETTA 1,794,264
VARIABLE SPEED GEARING, PARTICULARLY FOR MOTOR VEHICLES
Filed Nov. 19, 1929
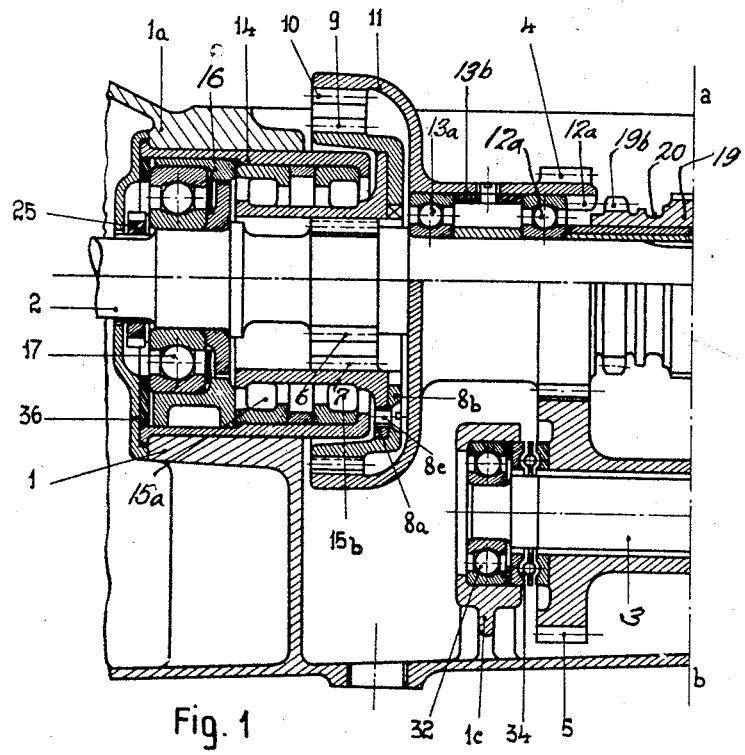
Fig. 1
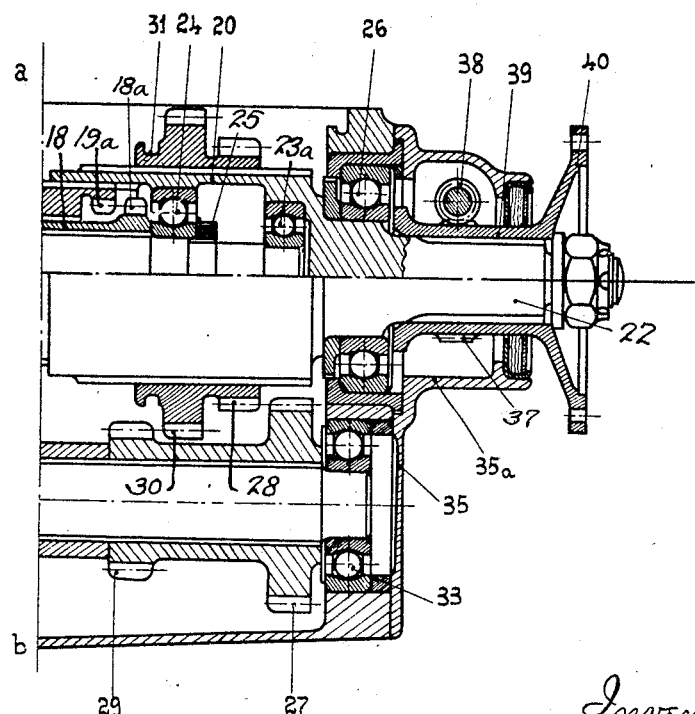
Inventor,
Vittorio Valletta,
By Henry Ortt Jr
Atty.

Patented Feb. 24, 1931

1,794,264

UNITED STATES PATENT OFFICE

VITTORIO VALLETTA, OF TURIN, ITALY, ASSIGNOR TO FIAT SOCIETÁ ANONIMA, OF TURIN, ITALY

VARIABLE-SPEED GEARING, PARTICULARLY FOR MOTOR VEHICLES

Application filed November 19, 1929, Serial No. 408,293, and in Italy December 12, 1928.

This invention relates to a variable speed gearing with sets of internally toothed gears of the type described in my co-pending patent application Ser. No. 351,971, filed April 2, 1929 and application of even date and its purpose is to make the mechanism cheaper and easier in construction and operation.

An object of my invention is to provide a variable speed gearing in which the C-shaped ring is made in two parts fixed together by means of screws or bolts in order to facilitate assembly.

Another object of my invention is to provide a variable speed gearing in which the slidable gear member for the lower speeds is displaceable on the transmission shaft, instead of on the countershaft (as described in my previous applications), and therefore on the same shaft as the sliding member for the higher speeds.

Another object of my invention is to provide a variable speed gearing, in which the support for the C-shaped ring is strengthened by avoiding slots therein, the countershaft being driven by a gear cut on the last internally toothed member, i. e. on the opposite side of this latter with respect to the C-shaped ring.

The accompanying drawing shows, by way of example, an axial longitudinal section of the construction.

Referring to the drawing, the gearbox is in two parts 1 and 1a and houses the engine shaft 2 and the countershaft 3. The engine shaft 2 carries the pinion 6 in gear with the internal set of teeth 7 of the C-shaped ring which is formed in two parts 8a: 8b connected together by screws 8c. While the ring portion 8a carries the said internal set of teeth 7, the portion 8b carries the external set of teeth 9 in gear with the internal teeth 10 of the crown 11 having the hub or sleeve 12. The pinions 7 and 9 of the ring 8a—8b being eccentric to the axis of the engine shaft 2, are supported by the support 14 eccentrically displaced with respect to said axis and gripped between the two sections 1—1a of the gearbox. In the support 14 a member 16 having a part co-axial with the shaft 2 carries the ball bearing 17 for this latter. The support 14 enters the hollow of the C-section ring 8a—8b and supports this latter through two roller bearings 15a and 15b, the latter being in the plane of the pinions 6:7 and 9:10 the reaction of which it absorbs. This construction advantageously avoids the bending couple tending to incline the planes of the various teeth sets one to the other. The hub 12 of the crown 11 turns on the shaft 2 with the interposition of the ball bearings 13a and 13b, the latter being but slightly displaced relatively to the pinion 4 cut on the hub 12 and meshing with the pinion 5 keyed on the countershaft 3.

The engine shaft 2 reaches within the bell 20 of the transmission shaft 22 supported by a bearing 26, two ball bearings 23a and 24 for mutually supporting the shafts 2 and 22 being interposed between the shaft 2 and the bell 20. The ball bearings 23a and 24 also absorb the reaction of the pinion pairs 27:28 and 29:30 when one or the other is rendered operative for the second or first speed.

The sets of teeth 28:30 form part of a gear member slidable by a fork (not shown) engaging the collar 31, said member being feathered on the bell 20. The co-acting sets of teeth 27:29 form part of a non-slidable gear member keyed on the countershaft 3. The sleeve 19, moved by a fork (not shown) engaging the collar 21, slides within the bell 20 by means of co-acting teeth and grooves.

The sleeve 18 is fixed to the engine shaft 2 and is provided with dog teeth 18a meshing with the teeth 19a of the sleeve 19 when this latter is moved towards the right; in this case the engine shaft is directly connected with the transmission shaft 22. The hub 12 of the crown 11 is provided with dog teeth 12a meshing with teeth 19b on the sleeve 19 when this latter is displaced towards the left; in this case the engine shaft 2 is connected to the transmission shaft 22 through the pairs of gears 6:7 and 9:10. In the former case the mechanism is set for the "direct drive" or fourth gear, in the latter case it is set for the next lower speed, i. e. third gear. The first and second speed are obtained by leaving the sleeve 19 in the free position and displacing to the left and to the right respectively the gear set 28—30 as aforesaid.

Rings 25 serve for clamping the various members mounted on the engine shaft 2 against shoulders on said shaft. The countershaft 3 is supported by a bearing fixed to the rear wall of the gearbox 1 and by a bearing 32 carried by a socket 1c in the gearbox 1 and by a bearing 33 carried by the box 1. A thrust bearing 34 absorbs the front reaction of the transmission. The bearings fixed to the gearbox 1:1a are protected by covers 35 and 36, the former of which is provided with a small case 35a enclosing the worm wheel 37 and worm 38 driving a speedometer.

On the shaft 22 is keyed the sleeve 39 carrying the wheel 37 with the flange 40 for coupling with the transmission of the vehicle.

The gearbox 1:1a is provided with a top cover and the members for operating the variable speed gears (levers, rods, forks, etc.) are of the usual type.

The working is as follows: With the various gearing members in the position shown, the first speed is obtained by throwing the toothed wheel 30 into gear with the toothed wheel 29, the second speed by throwing the toothed wheel 28 into gear with the toothed wheel 27, the third speed by returning the toothed wheels 28 and 30 into the position shown and by displacing the movable clutch member 19 to the left so as to throw the teeth 19b into gear with the teeth 12a and finally the fourth speed is obtained by displacing the movable clutch member 19 to the right so as to cause the teeth 19a to mesh with the teeth 18a.

It is clear that the constructional details may be varied according to the type of gearing, the number of gear ratios, the engine power etc. without departing from the scope of the invention.

What I claim is:

1. A variable speed gearing comprising a gear-box, an engine shaft having one end projecting into the box, a pinion on said shaft, a transmission shaft having a bell-shaped end in which the projecting end of the engine shaft is coaxially supported, a two-part C-shaped ring eccentrically disposed with respect to the axis of the engine and transmission shafts, internal teeth on one part of said ring meshing with the pinion on the engine shaft, external teeth on the other part of said ring, a sleeve rotatably mounted on the engine shaft, a pinion on the sleeve, an internally toothed crown formed integral with the sleeve and meshing with the external teeth of said ring, an annular support for the latter, a bearing carried by the support in the plane of the teeth of the ring, a counter shaft, a pinion on the latter in mesh with the pinion on the sleeve, two pinions on the counter shaft, gears carried by the bell-shaped end of the transmission shaft movable into and out of mesh with the pinions on the counter shaft, a double clutch member axially movable within the bell, teeth on the engine shaft for engagement with the clutch, and teeth on the sleeve for engagement with said clutch.

2. A variable speed gearing comprising a gear-box, an engine shaft having one end projecting into the box, a pinion on said shaft, a transmission shaft having a bell-shaped end, bearings in the latter supporting the engine shaft, a two-part C-shaped ring eccentrically disposed with respect to the axis of the engine and transmission shafts, internal teeth on one part of said ring meshing with the pinion on the engine shaft, external teeth on the other part of said ring, a sleeve rotatably mounted on the engine shaft having an internally toothed crown meshing with the external teeth of said ring, an annular support, bearings in the latter supporting said ring in the plane of the teeth, a pinion on said sleeve, a bearing between the latter and the engine shaft in the plane of the pinion on the sleeve, a counter shaft, a pinion on the latter meshing with the pinion on the sleeve, gears on the counter shaft, gears axially movable on the bell-shaped end alternately movable into mesh with the gears on the counter shaft, a double clutch member axially movable in said bell-shaped end, and teeth on the engine shaft and on the sleeve for alternate engagement with the double clutch member.

In testimony that I claim the foregoing as my invention, I have signed my name.

VITTORIO VALLETTA.